(12) United States Patent
Ulichney et al.

(10) Patent No.: US 9,361,516 B2
(45) Date of Patent: *Jun. 7, 2016

(54) FORENSIC VERIFICATION UTILIZING HALFTONE BOUNDARIES

(75) Inventors: Robert Alan Ulichney, Stow, MA (US); Stephen Pollard, Dursley (GB); Matthew D Gaubatz, Seattle, WA (US); Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/347,359

(22) PCT Filed: Feb. 9, 2012

(86) PCT No.: PCT/US2012/024447
§ 371 (c)(1),
(2), (4) Date: Mar. 26, 2014

(87) PCT Pub. No.: WO2013/119233
PCT Pub. Date: Aug. 15, 2013

(65) Prior Publication Data
US 2014/0348375 A1 Nov. 27, 2014

(51) Int. Cl.
*G06K 9/00* (2006.01)
*G06K 9/74* (2006.01)
*G07D 7/20* (2016.01)
*G06K 9/46* (2006.01)
*G06K 15/02* (2006.01)
*H04N 1/32* (2006.01)

(52) U.S. Cl.
CPC .............. *G06K 9/00496* (2013.01); *G06K 9/46* (2013.01); *G06K 9/74* (2013.01); *G06K 15/1881* (2013.01); *G07D 7/2033* (2013.01); *H04N 1/32144* (2013.01); *H04N 1/32256* (2013.01)

(58) Field of Classification Search
None
See application file for complete search history.

(56) References Cited

U.S. PATENT DOCUMENTS

| 6,307,955 | B1 | 10/2001 | Zank et al. |
| 7,197,644 | B2 | 3/2007 | Brewington |
| 7,394,573 | B1 * | 7/2008 | Goldberg et al. ............ 358/3.28 |
| 7,751,584 | B2 | 7/2010 | Zimmer et al. |
| 8,023,691 | B2 | 9/2011 | Rodriguez et al. |
| 2004/0101158 | A1 * | 5/2004 | Butler ........................... 382/100 |
| 2007/0188793 | A1 | 8/2007 | Wakai |
| 2011/0016388 | A1 | 1/2011 | Tang et al. |
| 2012/0070030 | A1 * | 3/2012 | Ulichney et al. .............. 382/100 |

FOREIGN PATENT DOCUMENTS

| CN | 102143176 A | 8/2011 |
| JP | 2004511938 | 4/2004 |
| WO | 2005064524 A1 | 7/2005 |

* cited by examiner

*Primary Examiner* — Stephen R Koziol
*Assistant Examiner* — Amandeep Saini
(74) *Attorney, Agent, or Firm* — Tarolli, Sundheim, Covell & Tummino L.L.P.

(57) ABSTRACT

A forensic verification system (700) extracts a print signature via print signature extractor 710 from the boundary of a halftone contained in an image. The system (700) compares the print signature to a reference signature stored in a registry via comparator 720 to determine differences between the print signature and the reference signature. The system 700 performs a forensic-level statistical image analysis via forensic analyzer 730 on the print signature and the reference signature based on the comparison to authenticate the printed media.

14 Claims, 7 Drawing Sheets

FORENSIC VERIFICATION UTILIZING HALFTONE BOUNDARIES

BACKGROUND

In environments where sensitive or confidential documents are handled, such as in financial institutions, it is often desirable to have the ability to trace who printed a document as well as when and where it was printed. For example, it may be desirable to know if a check or other financial instrument was printed from an authorized source (e.g., printer, location, and so forth) as opposed to being a fraudulent copy of the respective instrument. Electronic means, such as bar coding, have been applied to documents in an attempt to authenticate the legitimacy of the documents. Bar coding, for example, can unacceptably alter the appearance of the documents by embedding superfluous information such as the bar code image into the document.

BRIEF DESCRIPTION OF THE DRAWINGS

FIG. 1 illustrates an example system 100 for performing forensic verification of print media utilizing halftone boundaries to generate and verify print signatures. The system 100 includes a forensic encoding system 110 (also referred to as the encoding system) that utilizes halftone boundaries to encode forensic information. As shown, the forensic encoding system 110 receives a graphic image for encoding forensic information and payload. Output from the encoding system 110 includes a secure hardcopy and registry and support data that are employed by a forensic recovery and verification system 120 to perform forensic verification of printed documents and to recover payload data that had been previously encoded. As used herein, forensic analysis and verification provide the means to authenticate a printed document. This includes the ability to prove statistically whether or not a document was printed from an authorized source or is an unauthorized copy.

Figure 1:
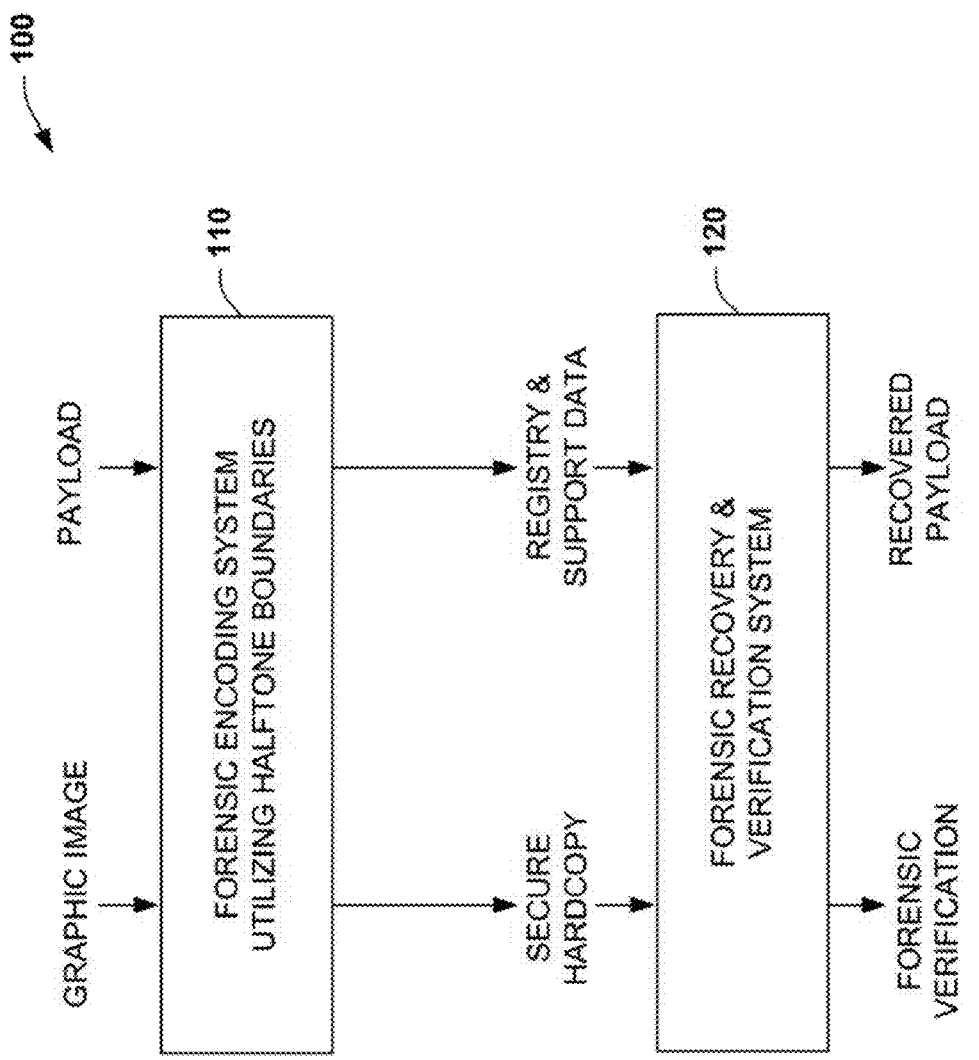
FIG. 1 illustrates an example system for performing forensic verification of printed documents utilizing halftone boundaries.

As an example of analysis and verification, electronic tickets and vouchers may be distributed from a ticket agency having an agency printer generate the tickets for their respective customers. The tickets printed from the agency printer are considered authorized and valid upon redemption. If someone were to print additional originals (electronic copies) or copy the ticket utilizing a scanner and subsequent printer, such printing would be unauthorized and fraudulent. The system 100 provides encoding and decoding of covert information placed within portions of printed documents to enable authentication. "Covert" implies that the authentication information is encoded as part of the printed image and thus undetectable by the naked eye. As can be appreciated, the authentication processes described herein can be applied to any type of printed document where it is desirable to verify that a given document corresponds to a unique physical instantiation. This functionality could also be used for applications that include but are not limited to cases where it is desirable to trace to the origins of the equipment, organization, or people, that generated the document (e.g., prove whether or not the document was generated by a particular printer, by an authorized printer, or conversely whether document was printed/copied from an unauthorized printing source).

The system 100 can also be employed to authenticate the association of two or more items, for example (e.g., a label or medallion with a serialized document on which the label/medallion is affixed). Since gray scale printing processes are inherently bi-tonal, halftoning processes can be utilized for continuous-tone graphics or images by producing the visual illusion of continuous tone though the arrangement of black and white pixels. One type of halftoning can be based on a clustered-dot technique, where gray levels are rendered with arrays of black and white clusters of pixels where the clusters are of varying size and shape. A stegatone is a halftone example that utilizes shifted dot clusters to encode information into a portion of the printed image.

As shown, the encoder 110 can embed a payload into a halftone of a graphic image. The payload represents the data to be embedded in the halftone that can also be later employed as part of the forensic verification process (e.g., to locate a reference print signature in a registry). The encoding process includes shifting of the dot clusters within the halftone to encode the payload within the halftone. The halftone can represent any portion of a printed document. For example, this could include a graphical feature such as a circle or square or irregular shaped image object or could include a symbol such as text or numeric characters, for example. Although stegatones which include a halftone pattern that holds steganographic information may be applied as part of the encoding and decoding process of the system 100, any form of halftone (e.g., with or without addition of the payload) can be utilized for the boundary authentication processes described herein. In one example, halftones may not change from print-to-print and in other examples each version of a halftone in each single printed page can be different. For instance, a halftone can be generated that varies only with the printing device, document author(s), user requesting the print, timestamp, security clearance, network state, or some combination of these and/or possibly other factors, for example.

The encoding system 110 creates and stores a reference signature in a registry (described below with respect to FIG. 2) that acts as a traceable fingerprint for a printed document that enables detection of authorized or unauthorized printing. The reference signature can be derived from the boundary or exterior of a printed object or component within the printed document. For example, if the symbol "a" were to have an encoded payload, the reference signature can be generated as a function of the edges or outline of the symbol as opposed to the interior halftones composing the symbol as will be illustrated below with respect to FIG. 3. In some examples, only the halftone may be employed for the encoding and decoding processes described herein. In other examples, a unique payload may be generated for the same common graphic image and subsequently used to index the print signature in the registry (e.g., one-to-one mapping between payload and print signatures). In yet another case, the same payload may be applied to the graphic image many times and used to index the resulting print signatures in the registry (e.g., one-to-many mapping between payload and print signatures).

To authenticate a printed document, a captured image to be analyzed is processed by the forensic recovery and verification system 120. The captured image (e.g., snapshot image of printed document) should be of sufficient resolution to enable the boundary analysis techniques described herein. For example, a high resolution camera or scanner (e.g., capable of acquiring an image at a resolution of 7200 dots per inch (DPI)) can be employed to capture printed media and generate the image to be analyzed. The forensic recovery and verification system 120 can generate a print signature that is derived from the boundary regions of the recovered halftone (or stegatone if a payload was encoded for the reference signature). The print signature boundary analysis and detection will be described below with respect to FIGS. 2-5. The forensic recovery and verification system 120 compares the so recovered print signature to the reference print signature stored in the registry.

An authentication event occurs by the forensic recovery and verification system 120 based on a comparison between the reference signature from the registry and the print signature derived from the captured image. This can include a statistical analysis (e.g., compare print signature edge/boundary differences to a statistical threshold, where the threshold is a designated level of statistical confidence to grant authentication). The authentication can include other analysis such as an machine learning or artificial neural network analysis where trained classifiers analyze the respective print signatures in view of the retrieved reference signatures from the registry. It is noted that the forensic analysis and verification procedures described herein can be applied to any type of printed document such as can be provided by printers or other devices such as copiers, fax machines, and multi-function print devices.

FIGS. 2-5 demonstrate some examples of forensic verification that can be implemented utilizing print signature boundaries. Such description will be provided in terms of specific examples such as the letter "a" as an example halftone image; however, any portion or an image other than symbols can be employed. Also, the examples include description of stegatones which are a particular category of halftones. As noted previously, the halftone itself can be employed by the boundary and signature analysis techniques described herein.

For purposes of simplification of explanation, in the present example, various components of the system 100, such as the encoding system 110 and the forensic verification system 120, are illustrated and described as performing different functions. However, one of ordinary skill in the art will understand and appreciate that the functions of the described components can be performed by different components, and the functionality of several components can be combined and executed on a single component. The components can be implemented, for example, as computer executable instructions (e.g., software, firmware), hardware (e.g., a CPU, an application specific integrated circuit), or as a combination of both. In other examples, the components could be distributed among remote devices across a network, for example. The executable instructions 110 can be provided as a non-transitory computer readable medium having the computer executable instructions stored thereon.

Figure 2:
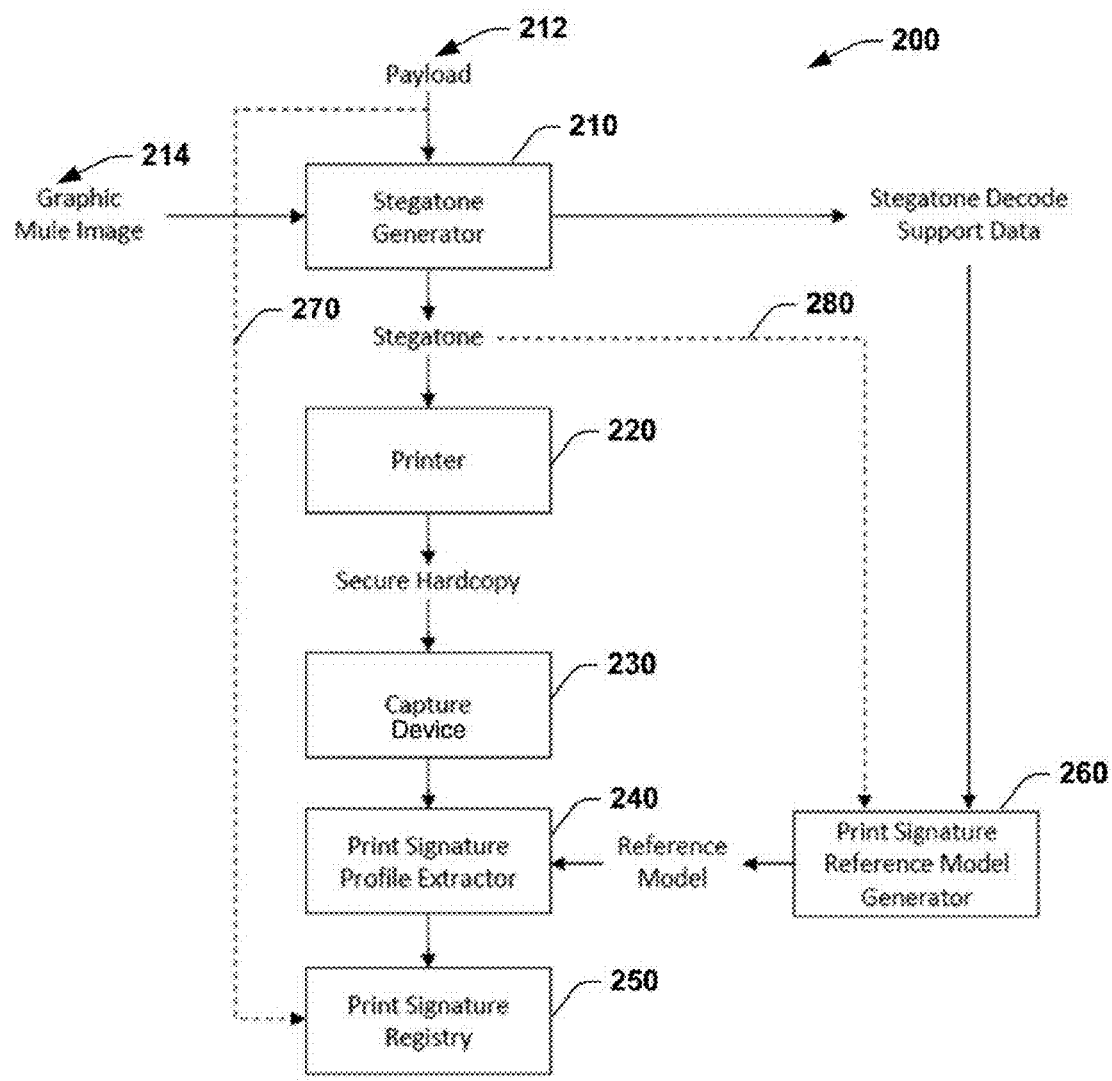
FIG. 2 illustrates an example of a forensic verification encoding system for generating reference signatures from halftone boundaries.

FIG. 2 illustrates an example of a forensic verification encoding system 200 for generating reference print signatures from halftone boundaries. It is noted that FIG. 2 will also be described collectively with respect to FIGS. 3 and 4 which depict symbols that represent stegatone encodings that employ edge refinement techniques in the case of FIG. 3 and do not employ edge refinement techniques in the case of FIG. 4. With respect to FIG. 2, a stegatone generator 210 receives a payload 212 and a graphic reference image 214 (also known as a mule image) and generates a stegatone and the accompanying stegatone decode support data. The reference image 214 is the portion of an image where data is encoded into the respective halftone. A printer 220 prints the stegatone and generates a secure hardcopy which is photographed or imaged by capture device 230. A print signature profile extractor 240 processes the captured image of the secure hardcopy and deposits a reference print signature in a print signature registry 250.

A print signature reference model generator 260 generates a reference model that is employed in the print signature extraction process. As shown, stegatone decode and support data may be utilized by the reference model generator 260. Dashed lines 270 and 280 indicate additional processing branches. For example, line 270 may include using the payload as an index in the print signature registry 250 to facilitate future forensic verification (e.g., utilizing the index improves upon searching sequentially through the print signature registry for a matching print signature which can be both slower and less robust than using the index). As another example, the line 280 demonstrates that the reference model generator 260 may also employ the stegatone to generate the reference model.

The system 200 provides a combination of a covert means of encoding data in hardcopy with halftones (e.g., steganographic halftones) and covert means of forensic verification with microscopic print signatures surrounding the outside of a high contrast graphical image. Different aspects include using a forensic reference model based on the input image, the edge-refined reference halftone, and/or the stegatone itself.

A function of the encoding system 200 is the creation of a secure hardcopy document with an embedded payload 212 along with filing its forensic fingerprint in the registry 250. The stegatone generator 210 takes a data payload 212 and input image 214 referred to as a "mule" since it is the vehicle that transports the payload when printed. As an example, one type of input images that can be utilized (others are possible) includes the class of graphic grayscale images that are dark objects surrounded by white space. Glyphs are members of this class and an example that is shown at 310 of FIG. 3, where the symbol "a" is depicted. At 600 dpi, this lower case 20-point "a" would appear 3 mm tall but the example illustration at 310 shows it at much larger size for purposes of illustration. Stegatones can be generated by shifting dot clusters within the halftone version of the reference image 214 to encode the payload 212 therein.

Figure 3:
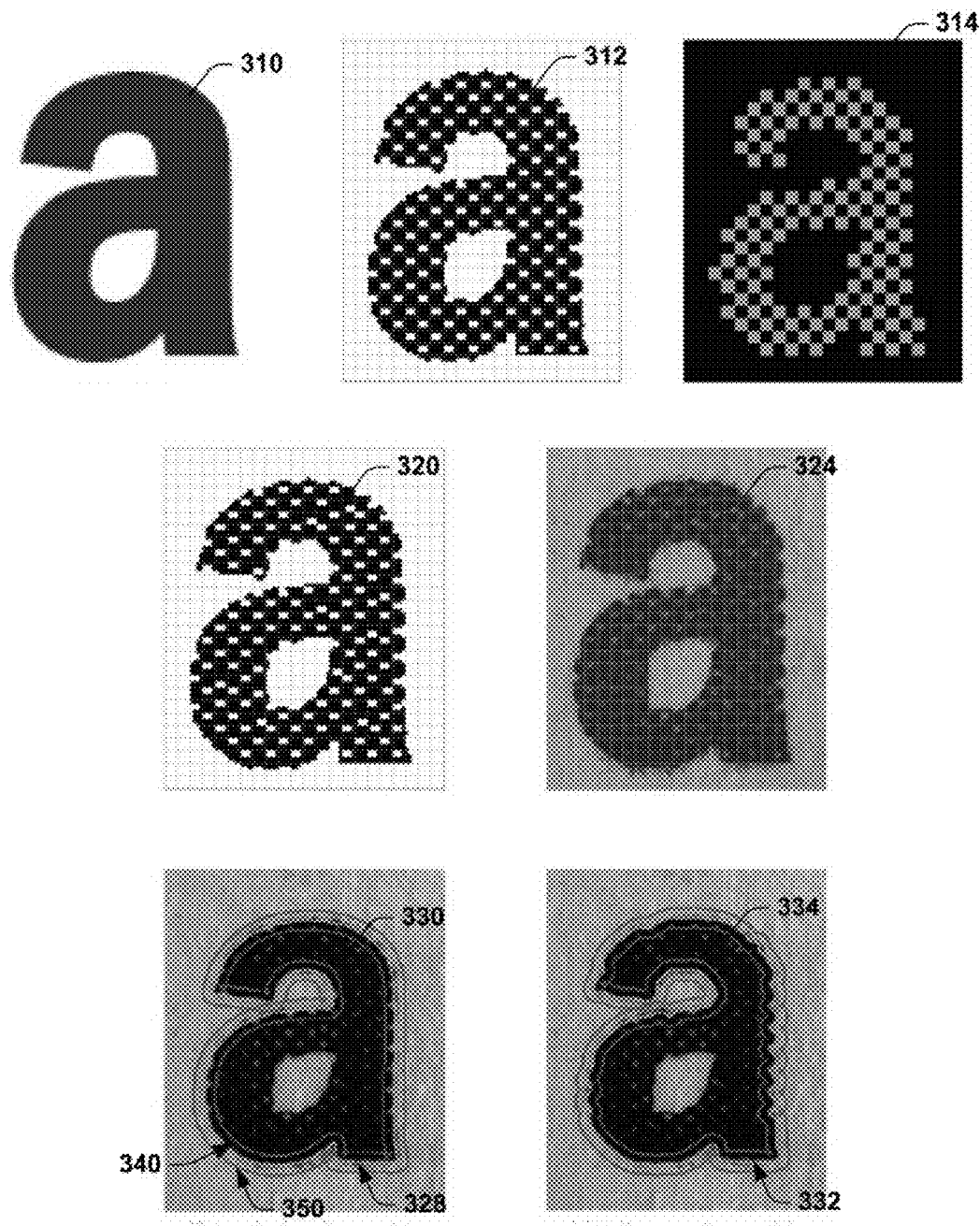
FIG. 3 illustrates an example set of symbols that represent stegatone encoding that employ edge refinement techniques.

After preprocessing, a reference halftone as shown at 312 of FIG. 3 can be generated from the mule image 214/310. The reference halftone can be a standard clustered-dot halftone, as shown at 312. Halftone cells can be classified in a reference map such as 0-bit, 1-bit, 2-bit, or 3-bit data carriers. Examples of these cells are depicted at 314 of FIG. 3. In this example, there are no 1-bit or 3-bit carrier cells. It is noted that 0-bit carriers are referred to as reference cells since they are unchanged from the original cells and can be used for alignment. For instance, cells can be reference cells because they are too large to be shifted or too small to be detected. Cells can also be forced to be reference cells if their unaltered shape is desired to retain edge detail or if they are needed to assist alignment. The payload 212 can be encoded by means of a single pixel shift of the halftone clusters, for example. The data carrying capacity of the image of FIG. 3 is 234 bits, for example. A 234-bit payload can be encoded as the steganographic halftone or "stegatone" as shown at 320 of FIG. 3. Along with producing this image, the stegatone generator 210 outputs stegatone decode support data that can be utilized for decoding the stegatone, possible regeneration of the stegatone, and/or used to build a reference model in order to support print signature extraction.

It is noted that many of the processes involved in the generation of stegatones and in particular stegatone decode support data are common across all stegatones related to the same reference image and hence many parts of this process may be performed once for the same stegatone application. Moreover, the stegatone decode support data is generally fixed and includes no information about the specific stegatone that has been generated. In the most general case, during recovery of the stegatone data, no assumptions can be made a priori regarding the content of the specific stegatone.

Stegatone decode support data includes the mule image 214, reference halftone, reference map, along with the shift and selection rules for decoding and possibly auxiliary information related to any error-control coding applied to the stegatone payload. The stegatone is passed to the printer 220 to create the printed hardcopy to secure by extracting and storing its forensic print signature. Locating a forensic "finger print" of the hard copy is a task of the print signature profile extractor 240. The secure hardcopy is digitized via the capture device 230. The capture device 230 should be of sufficiently high resolution to render forensic quality detail. A captured hardcopy is shown at 324 of FIG. 3.

A reference model of the edge surrounding the graphic image is the ideal against which the actual edge of the halftone is measured. Deriving the reference model is the task of the print signature reference model generator 260. The print signature reference model generator 260 uses as input the stegatone decode support data (e.g., provided by the stegatone generator 210 based on the payload and the mule image). When the mule image 214 is used, a "standard" outline model can be generated. For example, the reference image of letter "a" 310 can be used directly to generate a simple outline model. The image of 310 can be thresholded into a black and white image and connected components applied to the black pixels to identify those pixels that belong to the character. A chain code can then be used to define the perimeter of the component in order to define its outline model. Alternatively, similar processing can be applied to examples of the reference image that have been printed on a suitable printer and captured at high resolution (e.g., forensic quality). These results can be combined to produce an average characteristic print that is closer to physical reality.

An example of a standard model is depicted as an outline 328 of the character "a" demonstrated at 330 of FIG. 3. Another more accurate outline should more closely follow that of the halftone. For example, the stegatone generated in FIG. 3 employs an edge refinement process. This process retains a cleaner edge boundary surrounding the graphic object. Halftone cells near the edge that would be carrier cells instead retain the edge detail and become fixed reference cells. In this case, the edges of the reference halftone 312 can be used to generate the reference model for the resulting stegatones because those edges do not change with the payload 212. An example of a resulting edge-refined halftone outline model is shown as the line 332 at example symbol 334 of FIG. 3.

In both reference models shown at 330 and 334 of FIG. 3, the range (e.g., distance between outlines) over which the print signature is extracted is depicted by the distance between boundary lines 340 and 350. The process for quantifying the print signature profile can include extracting an image profile orthogonal to the outline model between the loci defined by these limits at a fixed number of points around the outline model. This profile image can then be processed to recover a dominant edge signal that represents the profile of the specific print.

The print signature can be normalized in part by defining it with respect to the reference model, and can then be stored in the print signature registry 250. The print signature can be reduced to a few hundred bytes of data using the shape warp coding (SWC) The print signature profile (which typically has 2000 or more elements) can be broken into a fixed number of intervals (between 50 and 200 depending on the desired balance between code length and statistical discrimination) over which variance is measured. Using the—mean such variance as a unit value, each interval can be quantized by rounding with respect to this value. The difference between SWC's, termed the SDED or "shape distortion encoding distance," provides a discrimination metric that can distinguish veridical matches with the probability of false positives/negatives of less than one chance in a billion, for example. The SDED is a modified form of Hamming distance and is a sum of the absolute differences in the respective elements of the SWC's representing each signature profile.

Figure 4:
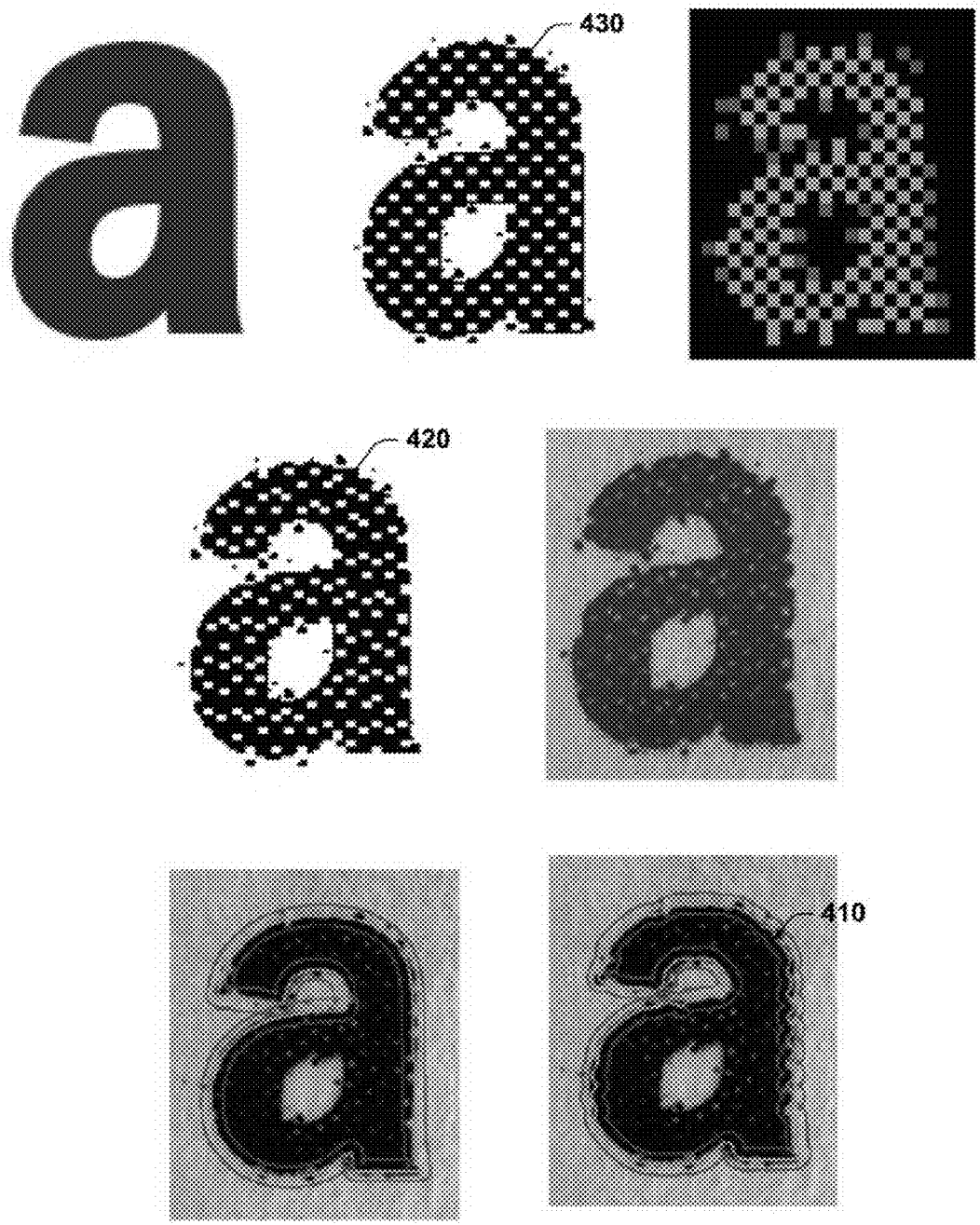
FIG. 4 illustrates an example set of symbols that represent stegatone encoding that does not employ edge refinement techniques.

FIG. 4 illustrates an example where edge refinement is not used. In this case, most of the halftone cells at the edges of the graphic object are carrier cells and not reference cells. One of the reasons for not using edge refinement is that the cells at the edges can be encoded to carry data. Thus, the carrying capacity of the stegatone in FIG. 4 can be increased relative to circumstances where edge refinement is used. For example, the carrying capacity for the character "a" can increase to 301 bits from the 234 bits for where edge refinement is used in FIG. 3. The description of the items in FIG. 4 is the same as those in FIG. 3 except at 410 of FIG. 4. In this example, the reference model can be generated (e.g., by reference model generator 260 of FIG. 2) based on the stegatone, shown at 420 of FIG. 4, and not from the reference halftone as depicted at 430 of FIG. 4. This additional input is depicted in FIG. 2 as the dashed line 280. While for the case of the mule reference image and the reference halftone, the reference model can be generated by printing and scanning example images of the actual halftone, while this may not be possible for the case of the stegatone as the latter is not known in advance of its generation. Hence, for some systems the stegatone reference model can only be generated from the digital representation of the stegatone. The process of generation may include a model of the printing process in order to more accurately render a suitable outline model of the specific stegatone.

Figure 5:
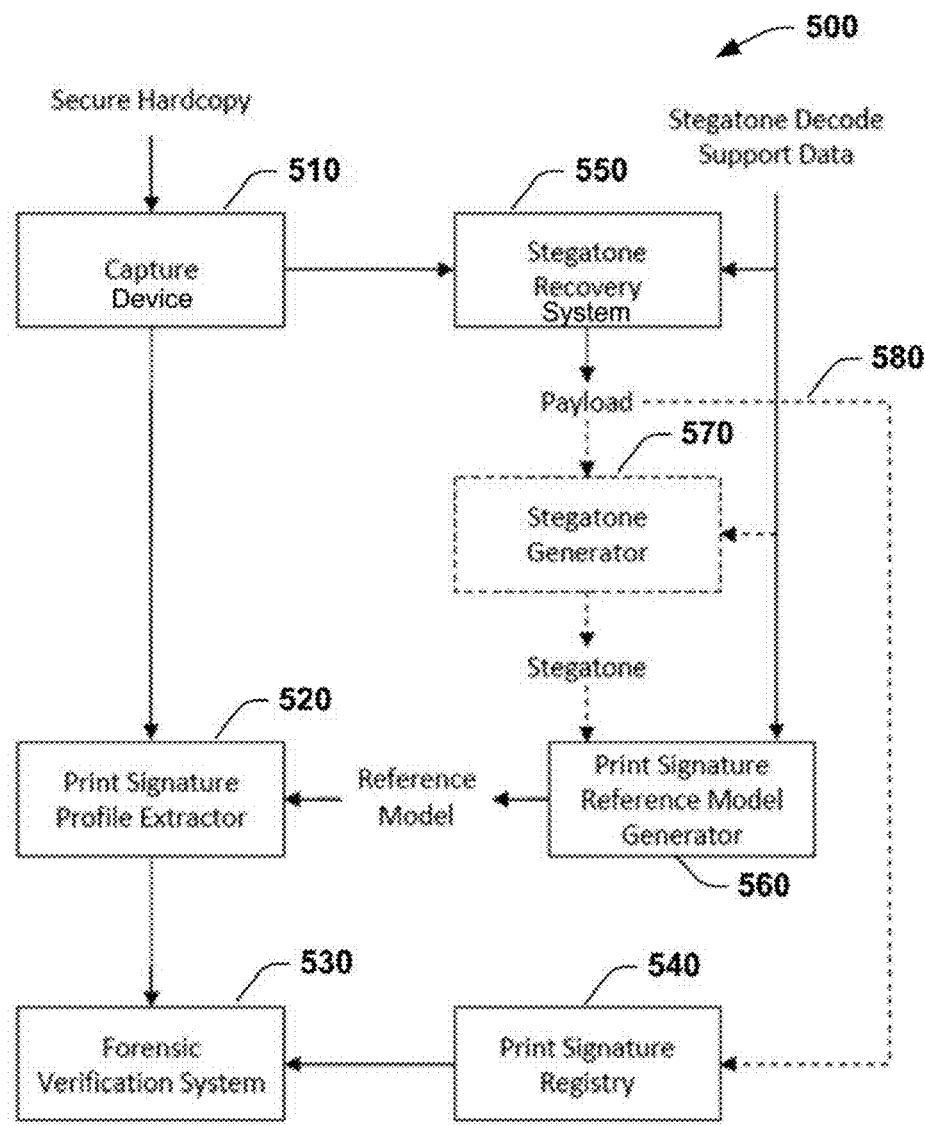
FIG. 5 illustrates an example of a forensic verification decoding system for analyzing reference signatures and print signatures utilizing halftone boundaries.

FIG. 5 illustrates an example of a forensic verification decoding system 500 for analyzing reference signatures and print signatures from halftone boundaries. A secure hard copy print is imaged by a capture device 510. The captured image is sent to a print signature profile extractor 520. The print signature profile extractor 520 employs a reference model to extract a print signature from the image of the secure hardcopy. The print signature profile extractor 520 passes the extracted print signature to a forensic verification system 530 for forensic comparison with previously stored signatures from a print signature registry 540. As part of the decoding process, a stegatone recovery system 550 may process stegatone decode and support data, such as disclosed above. The stegatone recovery system 550 can generate corresponding payload data from the captured image and the support data. A print signature reference model generator 560 can generate the reference model for the profile extractor 520.

In other examples, the forensic verification decoding system 500 can include a stegatone generator 570 that can regenerate the stegatone based on the payload and the stegatone decode and support data. The regenerated stegatone can be utilized by the print signature reference model generator 560 in conjunction with the stegatone decode and support data, for example, to generate the reference model. Additionally or alternatively, the payload data extracted by the stegatone recovery system can also be passed (via dashed line 580) to the print signature registry 540 to provide an index to facilitate comparison of the extracted print signature with the previous registered version(s).

The system 500 recovers the payload from the stegatone (or utilizes the halftone without payload) and verifies print signature with the signatures stored in the registry 540. Given the secure hardcopy document, hardware similar to what was used in the capture stage of the encode system of FIG. 2 can be used to create a digitized version of the printed document. This is passed to the stegatone recovery system 550 along with the stegatone decode support data as generated by the encoding system described above. One aspect to recovering the payload is the precise alignment of the captured image. This exploits the fact that the boundaries of each halftone cell are known. For the purpose of illustration, examples of the halftone cell boundaries are shown overlaying the digital images at 312 and 320 of FIG. 3. Since the digital stegatone will not yet be available, the reference halftone 312 can be used to align the captured image, wherein the properly aligned cell boundary lines are also overlaid on this image such as shown at 324 of FIG. 3. The cell shifts are subsequently located and the payload can be recovered.

Because of imperfections in and/or noisy aspects of the print-capture process, it is possible for errors to be introduced into a payload. For this reason, error correction codes can be used. Aspects of the procedure of interpreting the payload is analogous to the procedure of reading digital information from other physical media, such as CDs, or some types of disks since the processes that perform measurements to determine the represented bits are typically not error-free, the data should be protected with error correction codes. In the case of stegatones, data can be represented by tiny shifts in sub-elements (e.g., a subset of pixels) of a printed dot cluster. Scratches or folds can make interpretation of the shift ambiguous. Even without physical degradations of the document, nonlinearities in the printer or capture device can distort alignment which in turn can result in errors in data recovery. Error correction coding utilizes redundancy in a strategic manner to detect and correct such errors.

The print signature profile extractor 520 operates in a symmetrical manner to that used in the encoder described in FIG. 2. As in the encoder, the reference model generator 560 only needs the mule input image if the standard model is used, or the reference halftone if the halftone model is used, both of which are part of the stegatone decode support data set. When the stegatone model is needed, such as in the example of 410 of FIG. 4, the stegatone generator 570 can regenerate the stegatone as illustrated as dashed lines in the example of FIG. 5. When the payload is successfully recovered, the original digital stegatone can be recreated based on the payload and the stegatone support data as mentioned above. Alternatively or additionally, the recovered payload can be used to address a subset of the registry 540 to speed the search for the correct print signature. When the reference model is established, such as by one or a combination of methods disclosed herein, the print signature profile can be extracted. The difference from the reference model is then used to compare with the print signature registry 540 for forensic verification. One example includes a case where a different payload was used for each secure hardcopy document. The recovered payload 580 could then address one print signature in the registry to compare with the print signature extracted in 520. If the difference between the extracted and registered signatures was below a threshold then the authenticity of the secure document can be verified.

Figure 6:
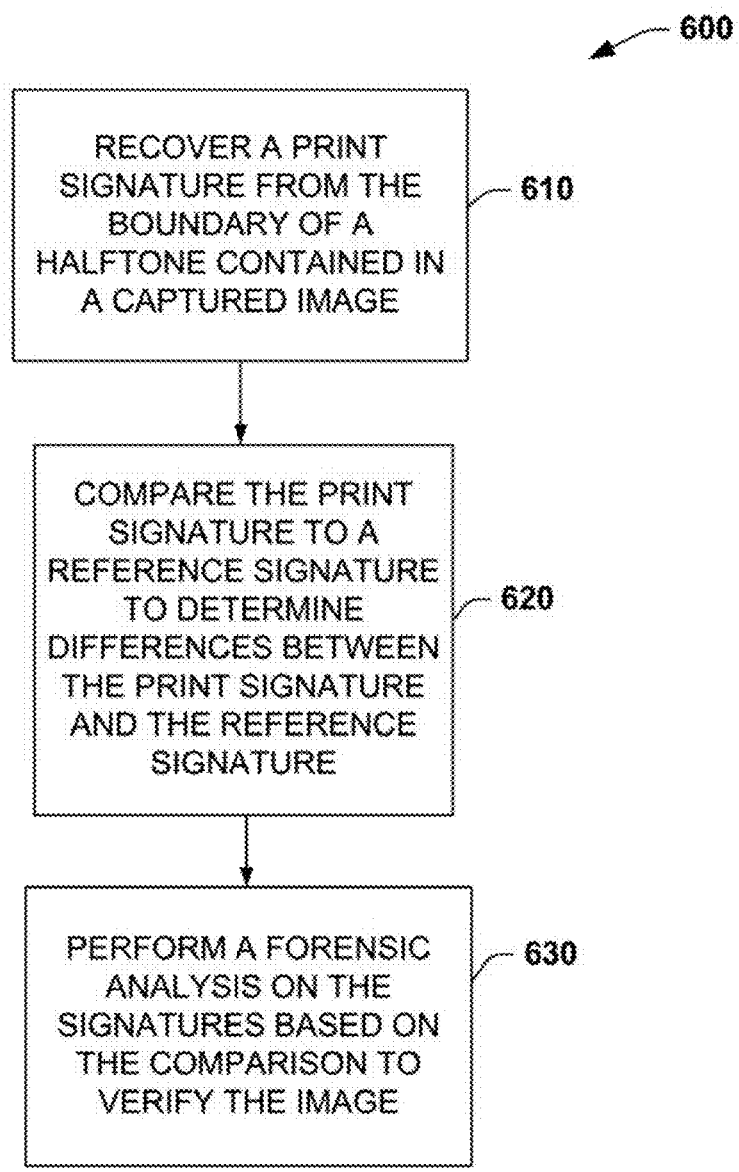
FIG. 6 illustrates an example method for performing forensic verification of printed documents utilizing halftone boundaries.

In view of the foregoing structural and functional features described above, an example method will be better appreciated with reference to FIG. 6. While, for purposes of simplicity of explanation, the method is shown and described as executing serially, it is to be understood and appreciated that the method is not limited by the illustrated order, as parts of the method could occur in different orders and/or concurrently from that shown and described herein. Such a method can be executed by a processor and associated equipment, for example.

FIG. 6 illustrates an example method 600 for performing forensic verification of printed media utilizing halftone boundaries to generate and analyze print signatures. The method 600 includes recovering a print signature from the boundary of a halftone contained in a captured image at 610 (e.g., via pint signature extractor 710 of FIG. 7). At 620, the method 600 includes comparing the print signature to a reference signature to determine differences between the print signature and the reference signature (e.g., via comparator 720 of FIG. 7). At 630, the method 600 includes performing a forensic analysis on the signatures based on the comparison to verify the image (e.g., via forensic analyzer of FIG. 7). Although not shown, in other examples, the method 600 can include encoding a payload into the halftone to form a stegatone. This can include generating the stegatone with edge refinement that does not encode information in boundary cells of the stegatone. In another example, the method 600 can include generating the stegatone without edge refinement that encodes payload information in boundary cells of the stegatone.

Figure 7:
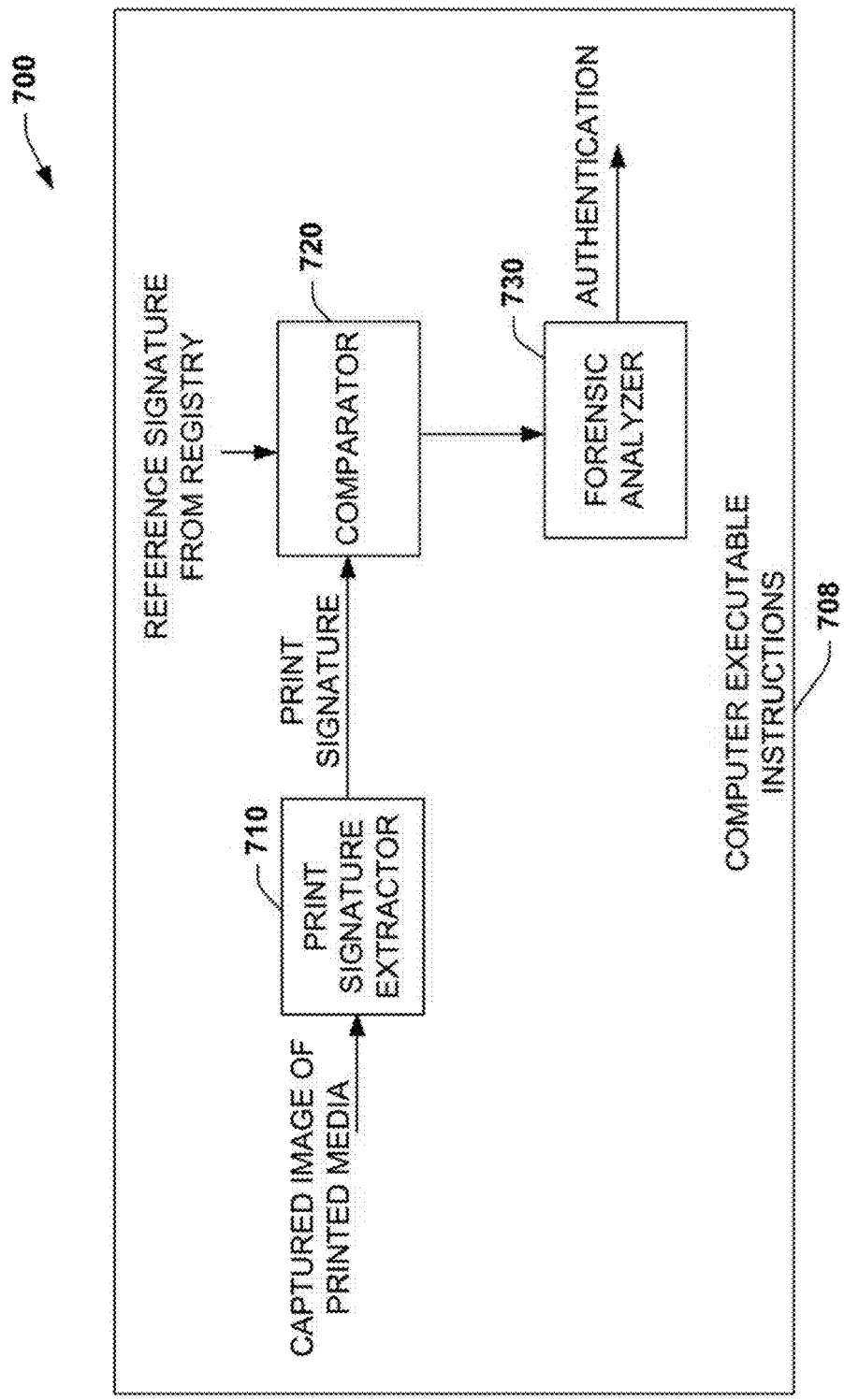
FIG. 7 illustrates an example of a forensic analysis system.

FIG. 7 illustrates an example of a forensic analysis system 700. The system 700 includes computer executable instructions 708 that enable a forensic analysis and verification of printed documents. The system 700 includes a print signature extractor 710 to extract a print signature from a boundary of a halftone of an image of printed media. A comparator 720 compares the print signature to a reference signature stored in a registry to determine differences between the print signature and the reference signature. A forensic analyzer 730 performs a forensic-level statistical image analysis on the print signature and the reference signature based on the comparison to authenticate the printed media.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory computer readable medium comprising computer executable instructions that when executed cause a processor to:
   extract a boundary of a halftone of an image of printed media, wherein at least a portion of the boundary defines a print signature; and
   authenticate the printed media based on a forensic-level statistical image analysis,
   wherein the forensic-level statistical analysis comprises:
      accessing a reference signature stored in a registry, wherein the reference signature comprises payload information encoded into a boundary of a reference halftone;
      comparing the print signature to the reference signature to determine differences between the payload information of the reference signature and the print signature; and
      verifying whether the printed media is authentic based on the comparison.

2. The non-transitory computer readable medium of claim 1, wherein the halftone of the reference signature is encoded with payload information to form a stegatone.

3. A non-transitory computer readable medium comprising computer executable instructions that when executed cause a processor to:
   extract a print signature from a boundary of a halftone of an image of printed media;
   compare the print signature to a reference signature stored in a registry to determine differences between the print signature and the reference signature; and
   perform a forensic-level statistical image analysis on the print signature and the reference signature based on the comparison to authenticate the printed media, wherein the halftone is encoded with payload information,
   wherein the halftone is generated with a unique payload to form a one-to-one mapping between the print signature and the payload information.

4. The non-transitory computer readable medium of claim 1, wherein the halftone of the reference signature is generated with a common payload to form a many-to-one mapping between the print signature and the payload information.

5. A non-transitory computer readable medium comprising computer executable instructions that when executed cause a processor to:
   extract a print signature from a boundary of a halftone of an image of printed media;
   compare the print signature to a reference signature stored in a registry to determine differences between the print signature and the reference signature; and
   perform a forensic-level statistical image analysis on the print signature and the reference signature based on the comparison to authenticate the printed media wherein the halftone is encoded with payload information to form a stegatone that is generated with edge refinement that does not encode information in boundary cells of the stegatone.

6. The non-transitory computer readable medium of claim 5, further comprising computer executable instructions that when executed cause the processor to generate a reference model to be employed in a recovery process for recovering the print signature.

7. A non-transitory computer readable medium comprising computer executable instructions that when executed cause a processor to:
   extract a print signature from a boundary of a halftone of an image of printed media;
   compare the print signature to a reference signature stored in a registry to determine differences between the print signature and the reference signature; and
   perform a forensic-level statistical image analysis on the print signature and the reference signature based on the comparison to authenticate the printed media
   wherein the halftone is encoded with payload information to form a stegatone that is wherein the stegatone is generated without edge refinement that encodes the payload information in boundary cells of the stegatone.

8. The non-transitory computer readable medium of claim 7, further comprising computer executable instructions that when executed cause the processor to generate a reference model to be employed in a recovery process for recovering the print signature.

9. The non-transitory computer readable medium of claim 7, further comprising computer executable instructions that when executed cause the processor to perform shape warp coding to reduce the number of bytes in the print signature.

10. A method, comprising:
    recovering a boundary of a halftone of a captured image of printed media, wherein at least a portion of the boundary defines a print signature; and
    authenticating the printed media based on a forensic-level statistical analysis, wherein the forensic-level statistic analysis comprises:
       accessing a reference signature stored in a registry, wherein the reference signature comprises payload information encoded into the boundary of a reference halftone;
       comparing the print signature to the reference signature to determine differences between the payload information of the reference signature and the print signature; and
       verifying whether the printed media is authentic based on the comparison.

11. The method of claim 10, further comprising encoding payload information into the reference halftone to form a stegatone.

12. The method of claim 11, further comprising generating the stegatone with edge refinement that does not encode the payload information in boundary cells of the stegatone.

13. The method of claim 11, further comprising generating the stegatone without edge refinement that encodes the payload information in boundary cells of the stegatone.

14. A system comprising:
    a memory for storing computer executable instructions; and
    a processing unit for accessing the memory and executing the computer executable instructions, the computer executable instructions comprising:
       a profile signature extractor to recover a boundary of halftone of an image of a captured image of printed media based on a reference model, wherein at least a portion of the boundary defines a print signature;
       a print signature reference model generator to provide the reference model for the profile signature extractor based on a stegatone; and
       a forensic verification system to authenticate the printed media by comparing the stegatone in the reference model to the print signature.

* * * * *